United States Patent [19]

Miller

[11] Patent Number: 4,542,032

[45] Date of Patent: Sep. 17, 1985

[54] FEED SUPPLEMENTS AND METHODS FOR THE PREPARATION THEREOF

[75] Inventor: Alex E. Miller, Placentia, Calif.

[73] Assignee: Union Oil Company of California, Los Angeles, Calif.

[21] Appl. No.: 477,531

[22] Filed: Mar. 21, 1983

[51] Int. Cl.$^4$ ............................................... A23K 1/08
[52] U.S. Cl. .................. 426/319; 426/330.2; 426/335; 426/532; 426/583; 426/807
[58] Field of Search ................. 426/69, 335, 532, 583, 426/807, 330.2, 319

[56] References Cited

U.S. PATENT DOCUMENTS

| | | |
|---|---|---|
| 2,555,211 | 5/1951 | Walla . |
| 2,592,509 | 4/1952 | Block . |
| 2,695,235 | 11/1954 | de Goede . |
| 2,728,678 | 12/1955 | Sharp .................... 426/583 |
| 2,781,267 | 2/1957 | Traisman et al. ............. 426/506 X |
| 2,799,583 | 7/1957 | Harris .................... 426/69 |
| 2,930,696 | 3/1960 | Rodgers et al. . |
| 3,472,659 | 10/1969 | Mathur et al. ................ 426/330.2 |
| 3,876,805 | 4/1975 | Craig et al. . |
| 3,928,577 | 12/1975 | Kochurova et al. ........... 426/335 X |
| 4,048,346 | 9/1977 | Stoller .................... 426/583 |
| 4,081,555 | 3/1978 | Sawhill ................... 426/335 X |
| 4,338,343 | 7/1982 | Vidal ..................... 426/532 |

OTHER PUBLICATIONS

Rydholm, "Palping Processes", Interscience Publishers, New York, 1970, p. 774.
Hawley, "The Condensed Chemical Dictionary", Van Nostrand Reinhold Co., (1982), p. 934.
Webb et al., "Byproducts from Milk", Avi Publishing Co., (1970), pp. 102-119.

*Primary Examiner*—R. B. Penland
*Attorney, Agent, or Firm*—Robert J. Baran; Gregory F. Wirzbicki; Dean Sandford

[57] ABSTRACT

A feed supplement, e.g., an animal feed supplement, is prepared by a method comprising treating whey, for example, from the manufacture of cottage cheese or cheddar cheese, with a bisulfite moiety to react the lactose present in said whey and form a lactose-bisulfite addition product. The lactose-bisulfite addition product is more soluble in water than lactose; therefore, the treated whey may be condensed by removing water therefrom, without sedimentation of the lactose during condensation or upon storage. The condensed whey may be mixed with a source of nutrients to provide a full ration animal feed.

11 Claims, No Drawings

FEED SUPPLEMENTS AND METHODS FOR THE PREPARATION THEREOF

BACKGROUND OF THE INVENTION

1. Field of the Invention

This invention relates to feed supplements and particularly to the manufacture of animal feed supplements comprising condensed whey products.

2. Background of the Art

Whey, a by-product of the cheese manufacturing process, is the aqueous solution remaining after the cheese is separated from the cultured milk. Whey contains various nutrients, including proteins, calcium salts, phosphate salts, and lactose. The large volume of whey that results from cheese manufacture represents a serious disposal problem. Lactose, the main ingredient in whey, causes the major problem of disposing of whey. In particular, whey can not be disposed of as sewage since lactose is a carbohydrate and can be utilized by various undesirable microorganisms for growth.

Whey is an obvious source of nutrients for animals and humans as well as microorganisms. However, it must be condensed by removing water to make it economical for use as a nutrient. For example, it is economically desirable to condense whey to about 40 percent dissolved solids, by weight, to avoid handling and shipping of large amounts of water. The solubility of lactose in water is only about 18 percent, by weight, at 25° C.; therefore there is a problem, for the lactose tends to undesirably sediment out of the condensed whey.

It might appear to be a simple matter (if one desired to obtain useful products by condensing whey) to allow the lactose crystals to precipitate from the condensed whey to recover both a solid lactose and a condensed whey which would not be subject to further lactose sedimentation. Lactose, however, has the tendency to form supersaturated solutions. Therefore unless long standing times can be tolerated, lactose continues to crystallize after the crystals of lactose are filtered from the supersaturated filtrate. The resulting heterogeneous condensed whey product is difficult to handle and as a result the simple removal of water to provide a condensed whey has not found commercial favor.

Condensation of whey and spray drying of the resulting condensate to provide a solid material for use in the food industry has also been attempted. The above noted insolubility of lactose in condensed whey solutions results in sedimentation during condensation and fouling of the heat exchange surfaces of the water removal devices by the sediment.

Many have tried to treat whey by methods other than condensation to recover useful products and avoid the problems of disposal. For example, ultrafiltration has been applied to whey to separate the lower molecular weight materials from the protein with the object being to isolate the fractions of whey and thus obtain more valuable products. The ultrafiltration of whey has been found to be uneconomic.

It has been proposed that, prior to condensation, the lactose in whey be hydrolyzed with mineral acid to yield lower sugars which are more soluble than lactose. However, even though lactose may be efficiently hydrolyzed with acid, the necessary requirements of heat, acid and time makes this process uneconomical.

Enzyme hydrolysis of the lactose to lactic acid or glucose and galactose has been utilized to provide a whey that does not separate upon condensation and storage. This process requires no heat input; however, the cost of the enzyme imparts an unacceptable economic burden on the process.

Finally, the treatment of whey with alkaline materials to either coagulate the proteins or convert the lactose in whey to the more soluble lactulose has been suggested. It is found, however, that the alkaline treatment tends to degrade whey and therefore the product may lose some of its value as a food or nutrient. Recent processes, which utilize alkali treatment in combination with various complexing agents such as aluminates, borates (or boric acid), and/or treatments with trialkylamines (with or without boric acid), have been applied to minimize alkali degradation and optimize conversion of lactose to a more soluble isomer, i.e., lactulose. In each of these processes, however, the reactants utilized in the conversion of lactose to lactulose must be removed from the reaction product prior to use as an animal feed. For example, the boron from the boric acid reactant must be carefully removed because of its poisonous nature. Excessive aluminum also interferes with the proper assimilation of phosphorus, calcium and magnesium by an animal and, therefore, while not poisonous must be removed as well.

Thus it is one object of the invention to provide a whey condensate which does not sediment upon storage for long periods of time and/or at less than ambient temperatures.

It is another object of the invention to provide a whey condensate which does not have to be post treated to remove reactants or reaction products utilized in the solubilization of the lactose contained in the whey.

It is another object of the instant invention to provide a condensed whey which is suitable for blending with other sources of nutrients to provide a full ration animal feed.

It is another object of the invention to provide a condensed whey which is stable to fermentation and spoilage caused by microorganisms while in storage.

It is another object of the invention to provide a condensed whey which is useful for stabilizing blends thereof with other nutrient sources against spoilage.

It is another object of the invention to provide a blend of condensed whey and another source of nutrients having a high moisture content that is stable during storage.

It is another object of the invention to provide a treated whey that can be condensed without sedimentation of lactose therefrom.

Other objects and advantages of the invention will be apparent from the following specification.

SUMMARY OF THE INVENTION

The invention provides a method of inhibiting the crystallization or precipitation of lactose from whey which comprises contacting the whey with a bisulfite moiety, e.g., sodium bisulfite, to form a novel addition product of lactose and bisulfite. After formation of the addition product, water may be removed to yield a condensed whey which is stable against sedimentation during storage for long periods of time and/or at temperatures below ambient.

The condensed whey product described above may be blended with other sources of nutrients such as molasses, fibrous roughage, grain, non-protein nitrogen, minerals, vitamins, etc. to provide a full ration animal feed. The condensed whey product can also be used itself for its nutrient value since it is a source of both protein and carbohydrates. However, due to the inclusion of the bisulfite moiety, the condensed whey may not be as palatable as would be desired. Therefore, blending with another nutrient source to dilute the effect of the bisulfite on palatability is usually preferred. On the other hand, the inclusion of the bisulfite moiety (either as the lactose-bisulfite addition product or as excess bisulfite) in condensed whey acts to retard spoilage by microorganisms during storage. Thus, a further advantage provided by the condensed whey of the instant invention is that at a level of bisulfite sufficient to solubilize the lactose, the condensed whey, itself, imparts stability from microorganism spoilage to blended products.

DETAILED DESCRIPTION OF THE INVENTION

It has now been found that whey, which has a tendency to crystallize upon condensation, may be stabilized against such crystallization by treatment with a bisulfite moiety at conditions sufficient to convert lactose (the major component of whey) into a lactose-bisulfite addition product. The bisulfite treated whey may be condensed by removal of water at atmospheric pressure or under vacuum conditons to yield a condensed whey product containing at least about 35 percent and more preferably about 40 to about 50 percent, by weight, solids. The condensed whey may be utilized directly as an animal feed supplement or can be blended with another source of nutrients to provide a full ration animal feed.

More particularly, whey which may be obtained from the process for the manufacture of cheese, caseine whey, partially delactosed whey, and the whey filtrate obtained by the ultrafiltration of whey solutions or skim milk may be mixed with an aqueous solution including a bisulfite moiety at conditions suitable to react the lactose in the whey with said bisulfite moiety to form the addition product thereof. The bisulfite moiety may be provided by any suitable water-soluble salt containing said bisulfite moiety. For example, the ammonium, alkali metal and alkaline earth metal bisulfite salts are useful for providing the bisulfite moiety. The sodium bisulfite or the ammonium bisulfite salt is preferred for providing the bisulfite moiety due to the relative availability and cost of each. However, ammonium bisulfite is especially preferred since it provides an additional nutrient nitrogen in the condensed whey.

Alternatively, the bisulfite moiety can be obtained by passing $SO_2$ as a gas through a whey solution to generate the bisulfite in situ. The pH of the whey may first be adjusted with a base, e.g. NaOH, $Ca(OH)_2$, $NH_4OH$, etc. prior to passage of $SO_2$ therethrough to assist in solubilizing the $SO_2$ therein. Moreover, it is convenient to pass $NH_3$ through the whey simultaneously with or prior to the $SO_2$ to generate in-situ ammonium bisulfite.

The reaction of the bisulfite moiety and the lactose is substantially carried out on at least a stoichiometric basis although lesser amounts of bisulfite can be utilized to provide at least partial solubilization of lactose. Moreover, with excess bisulfite, the lactose-bisulfite addition product will not decompose to lactose if the bisulfite (as $SO_2$) is removed during storage. The excess bisulfite tends to inhibit spoilage by microorganisms during storage, and, therefore, an excess of bisulfite has certain advantages. For economy, it is preferred that an excess of no more than about 0.2 moles of bisulfite is provided for each mole of lactose in the whey.

The reaction may be carried out at any temperature at which the whey is liquid, e.g., such as at a temperature of about 30° F. to about 200° F. Since whey is available from the manufacture of cheese at a temperature of about 100° to about 150° F., this temperature range is conveniently utilized for the reaction whereby cooling of the whey solution may be avoided.

The reaction is usually carried out at ambient pressure conditions for convenience, however, it may be desirable to carry out the reaction at elevated pressures if the gaseous $SO_2$ is utilized as the bisulfite moiety to ensure increased solubility of $SO_2$ in the whey. Furthermore, condensation can be effected while the bisulfite reaction is taking place by carrying out the reaction under vacuum conditions and preferably while providing heat to assist in the removal of water.

The condensation of the whey is generally effected by heating the bisulfite-treated whey to an elevated temperature under vacuum to remove sufficient water to provide a condensed whey having at least about 35 percent and preferably from about 40 to about 50 percent solids, by weight. Alternatively, one might also condense the whey prior to treating with the bisulfite moiety provided that the condensation process is monitored to avoid excessive crystallization of lactose.

The preferred bisulfite-treated whey product after condensation is characterized as having at least about 1.0 percent sulfur and more preferably at least about 2 percent sulfur, e.g. 2 to 3 percent sulfur, by weight. This novel condensed whey will also comprise at least about 30 percent by weight lactose as the bisulfite addition product. The other solids include the other components of the whey prior to condensation and reaction with bisulfite moiety, e.g., proteins, calcium and phosphate salts, etc. The product may have an odor of $SO_2$, indicating that there may be some free $SO_2$ dissolved therein. The free $SO_2$ can be removed if-desired, by heating or adjusting the pH to neutralize the $SO_2$. However, since $SO_2$ acts as a preservative against spoilage by microorganisms, it is generally retained as is. The product is somewhat unpalatable due to the $SO_2$ content and therefore may be blended with molasses or other byproduct liquors to provide a more palatable animal feed supplement.

The condensed whey of this invention may be combined with various other nutrient sources to provide a full ration animal feed. For example, in a confined feed lot, a dressing agent including the condensed whey of this invention in combination with one or more other carbohydrate-containing by-product liquors such as molasses (including blackstrap, inverted blackstrap, inverted sugar-beet), hydrol syrup, wood-sugar syrup, citrus molasses, condensed distillers molasses solubles, refiners molasses, etc., which carbohydrate-containing liquor may be ammoniated or hydrolyzed with acid; may be combined, usually at a level of from about 5 to about 10 percent, by weight, with various sources of roughage, such as chopped corn sileage, hay, etc; nonprotein nitrogen, such as urea, ammonia, etc.; minerals, such as calcium, phosphorus, sulfur, iron, zinc, manganese, copper, cobalt, etc; vitamins such as the oil-soluble vitamins, A, D and E; grain, such as barley, wheat bran, crushed oats, cracked corn, etc.; and natural protein, such as soybean meal, cottonseed meal, fish meal, bone meal, blood meal etc., to provide a full ration animal feed. The grain and roughage may comprise about 50 to about 90 percent, by weight, of said full ration animal feed, with the weight ratio of grain to roughage varying from about 1 to about 0.1. A lower ratio of grain to roughage is preferred in situations where a rapid increase in weight is desired.

The invention is further illustrated by the following example which is illustrative of a specific mode of practicing the invention and is not intended as limiting the scope of the appended claims.

EXAMPLE 1

A sample of a previously condensed whey comprising 45 percent solids and having a dispersed phase comprising lactose crystals is heated to 150° F. and held at that temperature for one hour until the crystals dissolve. The resulting homogeneous solution is held at 150° F. and increased amounts of sodium bisulfite are dissolved therein. (The sodium bisulfite is dissolved directly in the heated solution.) An aliquot of the bisulfited whey solution is taken after each addition of sodium bisulfite and such aliquot is allowed to cool to room temperature (i.e. about 65° F.) and stand for two days. The cooled aliquots are centrifuged to determine volume of sediment. The results are summarized in table 1 below:

TABLE 1

| Sample | gm $NaHSO_3$ 100 gms Condensed Whey | % Volume Sediment |
|---|---|---|
| 1 | 0 | 31–35 |
| 2 | 2.5 | 22–27 |
| 3 | 5 | 13 |
| 4 | 7.5 | 0.5 |
| 5 | 10 | 0.1 |

It is noted that the control shows a crystallization sediment approximating ⅓ of the total volume of the aliquot. After two days' standing, the aliquot having 5 grams of sodium bisulfite per hundred grams of solution shows only 13 percent sedimentation by volume. However, when 7.5 grams of sodium bisulfite per hundred grams of solution (and greater) are added to the solution substantially no sedimentation occurs upon standing.

Each of the aliquot samples has a slight, free-$SO_2$ odor. Therefore, a pH adjustment of sample 3 is made to determine whether the formation of the lactose-bisulfite addition product is pH dependent. (The pH of the condensed whey is about 4.6). Sample 3 is divided into three samples and the pH is adjusted upward with a 25 percent, by weight, solution of sodium hydroxide in water to provide samples having a pH of 5, 6, and 7. The pH adjusted samples are stirred for one hour. It is found that none of the samples shows a decrease or increase in sedimentation, thus demonstrating that the formation of the lactose-bisulfite addition product is independent of pH in this range.

Moreover, although an acid pH tends to convert some of the bisulfite to $SO_2$, the preservative effects of $SO_2$ are useful in the products prepared by the instant invention and, therefore, an acid pH in the condensed whey is preferred. The tendency of the addition product of lactose and bisulfite to convert to $SO_2$ at an acid pH also results in the novel products of this invention being useful preservatives when combined with acidic feedstocks.

EXAMPLE 2

The procedure of example 1 is repeated except that potassium bisulfite is substituted, at an equivalent molar concentration, for sodium bisulfite. As with example 1, the volume of sediment upon standing decreases as the concentration of dissolved potassium bisulfite is increased.

EXAMPLE 3

The procedure of example 1 is repeated except that $SO_2$ gas is passed through the heated whey solution (after addition of a soluble base) to provide the equivalent concentrations of bisulfite dissolved therein. As with example 1, the volume of sediment, upon standing, decreases as the concentration of the bisulfite in the condensed whey increases.

EXAMPLE 4

The procedure of example 3 is repeated except that gaseous ammonia is simultaneously passed through the heated whey solution to provide additional nutrient nitrogen to the resulting bisulfited whey products. The volume of sediment in the resulting products upon standing is substantially similar to the volume of sediment of the bisulfited whey products of example 3. Moreover, when an equal concentration of ammonia is dissolved in the whey prior to addition of $SO_2$, similar results are obtained.

While particular embodiments of the invention have been described it will be understood of course that the invention is not limited thereto since many obvious modifications can be made and it is intended to include within this invention any such modifications as will fall within the scope of the appended claims.

Having now described the invention, I claim.

1. A method for inhibiting the crystallization or precipitation of lactose from whey which comprises contacting the whey with a bisulfite moiety to form a water-soluble addition product of lactose and said bisulfite moiety.

2. A method for preparing a condensed whey product which is stable to sedimentation, which comprises:
   (a) treating whey with a bisulfite moiety to form an addition product of lactose and said bisulfite moiety,
   (b) removing water from said treated whey, and
   (c) recovering a condensed whey having a solids content of at least 35 percent, by weight.

3. The method defined in claim 2 wherein said bisulfite moiety is provided by a water soluble salt selected from the group consisting of ammonium, alkali metal and alkaline earth metal bisulfites.

4. The method of claim 3 wherein said water soluble salt is sodium bisulfite.

5. The method of claim 3 wherein said water soluble salt is ammonium bisulfite.

6. The method of claim 2 wherein said bisulfite moiety is provided by passing gaseous $SO_2$ through said whey.

7. The method of claim 6 wherein $NH_3$ is passed through said whey simultaneously with or prior to said $SO_2$.

8. The method of claim 2 wherein said whey is treated at a temperature of about 100° to about 150° F.

9. The method of claim 2 wherein said bisulfite moiety is provided at a concentration of from about 1.0 to about 1.2 moles of bisulfite per mole of lactose.

10. The method of claim 2 wherein said water is removed by heating under vacuum to recover a condensed whey having about 40 to about 50 percent solids, by weight.

11. A method for preserving acidic feedstocks from spoilage by microorganisms which comprises combining said acidic feedstock with a spoilage inhibiting amount of a lactose-bisulfite addition product.

* * * * *